United States Patent
Lu et al.

(10) Patent No.: US 12,309,895 B2
(45) Date of Patent: May 20, 2025

(54) LIGHTING SYSTEM BASED ON GESTURE RECOGNITION MECHANISM

(71) Applicant: Xiamen PVTECH Co., Ltd., Fujian (CN)

(72) Inventors: Fuxing Lu, Fujian (CN); Ronghui Wang, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 48 days.

(21) Appl. No.: 18/243,699

(22) Filed: Sep. 8, 2023

(65) Prior Publication Data

US 2024/0373534 A1    Nov. 7, 2024

(30) Foreign Application Priority Data

May 5, 2023    (CN) .......................... 202310499115.9

(51) Int. Cl.
*H05B 47/10* (2020.01)
*H05B 45/18* (2020.01)
*H05B 47/115* (2020.01)
*G06F 3/01* (2006.01)

(52) U.S. Cl.
CPC ........... *H05B 47/115* (2020.01); *H05B 45/18* (2020.01); *G06F 3/017* (2013.01)

(58) Field of Classification Search
CPC .... H05B 47/10; H05B 47/105; H05B 47/115; H05B 47/125; H05B 47/175; H05B 47/195
See application file for complete search history.

(56) References Cited

U.S. PATENT DOCUMENTS

| | | | |
|---|---|---|---|
| 11,740,689 B1* | 8/2023 | Verplaetse | H04N 9/3182 345/156 |
| 2007/0291198 A1* | 12/2007 | Shen | G09G 3/3413 349/69 |
| 2016/0150624 A1* | 5/2016 | Meerbeek | H05B 47/12 315/297 |
| 2017/0055328 A1* | 2/2017 | Law | H05B 47/115 |
| 2023/0371152 A1* | 11/2023 | Aliakseyeu | G06F 21/32 |

* cited by examiner

*Primary Examiner* — Tung X Le
(74) *Attorney, Agent, or Firm* — Winston Hsu

(57) ABSTRACT

A lighting system based on gesture recognition mechanism includes a first proximity sensor, a second proximity sensor, a processing module and a lighting module. The first proximity sensor generates a first sensing signal. The second proximity sensor generates a second sensing signal. The processing module receives the first sensing signal and the second sensing signal. The processing module generates a gesture recognition result according to the order of receiving the first sensing signal and the second sensing signal. Then, the processing module generates a light adjusting signal according to the gesture recognition result, such that the light adjusting signal is transmitted to the lighting module so as to adjust the light characteristic of the lighting module.

9 Claims, 5 Drawing Sheets

LIGHTING SYSTEM BASED ON GESTURE RECOGNITION MECHANISM

BACKGROUND OF THE INVENTION

1. Field of the Invention

The present invention relates to a lighting system, in particular to a lighting system having gesture recognition mechanism.

2. Description of the Prior Art

With advance of technology, people's requirements for lighting devices are becoming higher. In order to satisfy the different market demands, dimming or color temperature adjusting technologies are constantly innovating. However, currently available dimming or color temperature adjusting technologies are complicated, which cannot effectively reduce the costs of lighting devices or lighting systems. Accordingly, the currently available dimming or color temperature adjusting technologies cannot conform to actual requirements. China Patent Publication No.: CN115580966A, China Patent Publication No.: CN109996371A and US Patent Publication No.: US20190362688A1 disclose dimming (or color temperature adjusting) technologies based on gesture. However, these technologies should be realized by applications or image processing technologies, so cannot solve the problems of prior art.

SUMMARY OF THE INVENTION

One embodiment of the present invention provides a lighting system based on gesture recognition mechanism, which includes a first proximity sensor, a second proximity sensor, a processing module and a lighting module. The first proximity sensor generates a first sensing signal. The second proximity sensor generates a second sensing signal. The processing module receives the first sensing signal and the second sensing signal. The processing module generates a gesture recognition result according to the order of receiving the first sensing signal and the second sensing signal. Then, the processing module generates a light adjusting signal according to the gesture recognition result, such that the light adjusting signal is transmitted to the lighting module so as to adjust the light characteristic of the lighting module.

In one embodiment, the lighting system further includes an infrared sensor. The infrared sensor generates a temperature sensing signal and transmits the temperature sensing signal to the processing module. The processing module generates the gesture recognition result according to the temperature sensing signal and the order.

In one embodiment, when the processing module determines that the temperature sensing signal is high-level, the processing module determines that the first sensing signal and the second signal are effective, and generates the gesture recognition result according to the order of receiving the first sensing signal and the second sensing signal.

In one embodiment, when the processing module determines that the temperature sensing signal is low-level, the processing module determines that the first sensing signal and the second signal are ineffective.

In one embodiment, the infrared sensor is disposed between the first proximity sensor and the second proximity sensor. When the processing module determines that the temperature sensing signal is low-level, the processing module stops generating the gesture recognition result.

In one embodiment, when the time point of the processing module receiving the first sensing signal is earlier than the time point of the processing module receiving the second sensing signal, the processing module generates the gesture recognition result of a first direction. When the time point of the processing module receiving the second sensing signal is earlier than the time point of the processing module receiving the first sensing signal, the processing module generates the gesture recognition result of a second direction.

In one embodiment, the first direction is contrary to the second direction.

In one embodiment, the lighting module includes a light-emitting module and a driving module.

In one embodiment, the light-emitting module is a light-emitting diode or a light-emitting diode array.

In one embodiment, the light characteristic is brightness or color temperature.

The lighting system based on gesture recognition mechanism in accordance with the embodiments of the present invention may have the following advantages:

(1) In one embodiment of the present invention, the lighting system based on gesture recognition mechanism includes a first proximity sensor, a second proximity sensor, a processing module and a lighting module. The first proximity sensor generates a first sensing signal. The second proximity sensor generates a second sensing signal. The processing module receives the first sensing signal and the second sensing signal. The processing module generates a gesture recognition result according to the order of receiving the first sensing signal and the second sensing signal. Then, the processing module generates a light adjusting signal according to the gesture recognition result, such that the light adjusting signal is transmitted to the lighting module so as to adjust the light characteristic of the lighting module. This gesture recognition mechanism can be realized by several proximity sensors without any application or image processing technology, so this gesture recognition mechanism can significantly decrease the complexity of the light characteristic adjusting (dimming or color temperature adjusting) mechanism. Thus, the cost of the lighting system can be reduced in order to conform to actual requirements.

(2) In one embodiment of the present invention, the lighting system further includes an infrared sensor, such that the processing module can determine whether the first sensing signal and the second sensing signal are effective or not according to the temperature sensing signal of the infrared sensor. This mechanism can effectively avoid that the light characteristic adjusting function is mistakenly triggered. Accordingly, the light characteristic adjusting function of the lighting system can achieve high detecting precision.

(3) In one embodiment of the present invention, the light characteristic adjusting function of the lighting system can be used to realize the dimming function or the color temperature adjusting function, such that the lighting system can meet the requirements of different users. As a result, the lighting system can be more flexible in use and comprehensive in application.

(4) In one embodiment of the present invention, the light characteristic adjusting function of the lighting system can be used to realize the intelligent control, so the lighting system can be intellectualized. Thus, the lighting system can meet the future development trend.

(5) In one embodiment of the present invention, the design of the lighting system is simple, so the lighting system can achieve the desired technical effects without significantly increasing the cost thereof. Therefore, the lighting system can have high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
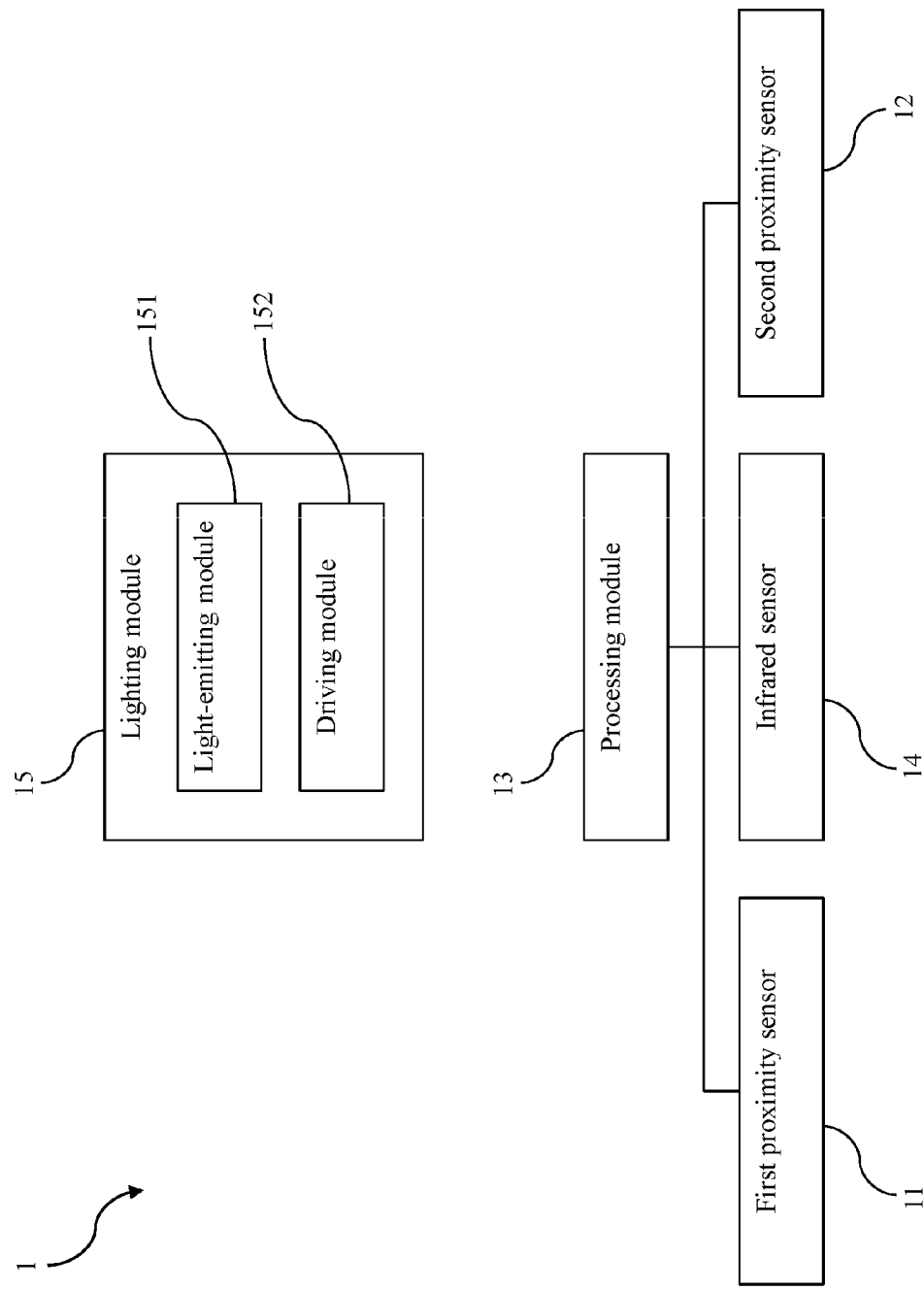
FIG. 1 is a block diagram of a lighting system having gesture recognition mechanism in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a lighting system having gesture recognition mechanism in accordance with one embodiment of the present invention. As shown in FIG. 1, a lighting system 1 includes a first proximity sensor 11, a second proximity sensor 12, a processing module 13, an infrared sensor 14 and a lighting module 15.

The first proximity sensor 11, the second proximity sensor 12 and the infrared sensor 14 are connected to a processing module 13. In one embodiment, the processing module 13 may be a central-processing unit (CPU), a microcontroller unit (MCU), an application specific integrated circuit (ASIC), a field programmable gate array (FPGA) or other similar components.

The lighting module 15 can communicate with the processing module 13 via the communication module (not shown in the drawings). In one embodiment, the communication module may be an antenna or other circuits having wireless communication function. In one embodiment, the light-emitting module 151 may be a light-emitting diode (LED), a LED array, a fluorescent lamp, a bulb or other similar components. In one embodiment, the lighting module 15 may be connected to the processing module 13 via a cable.

Figure 2:
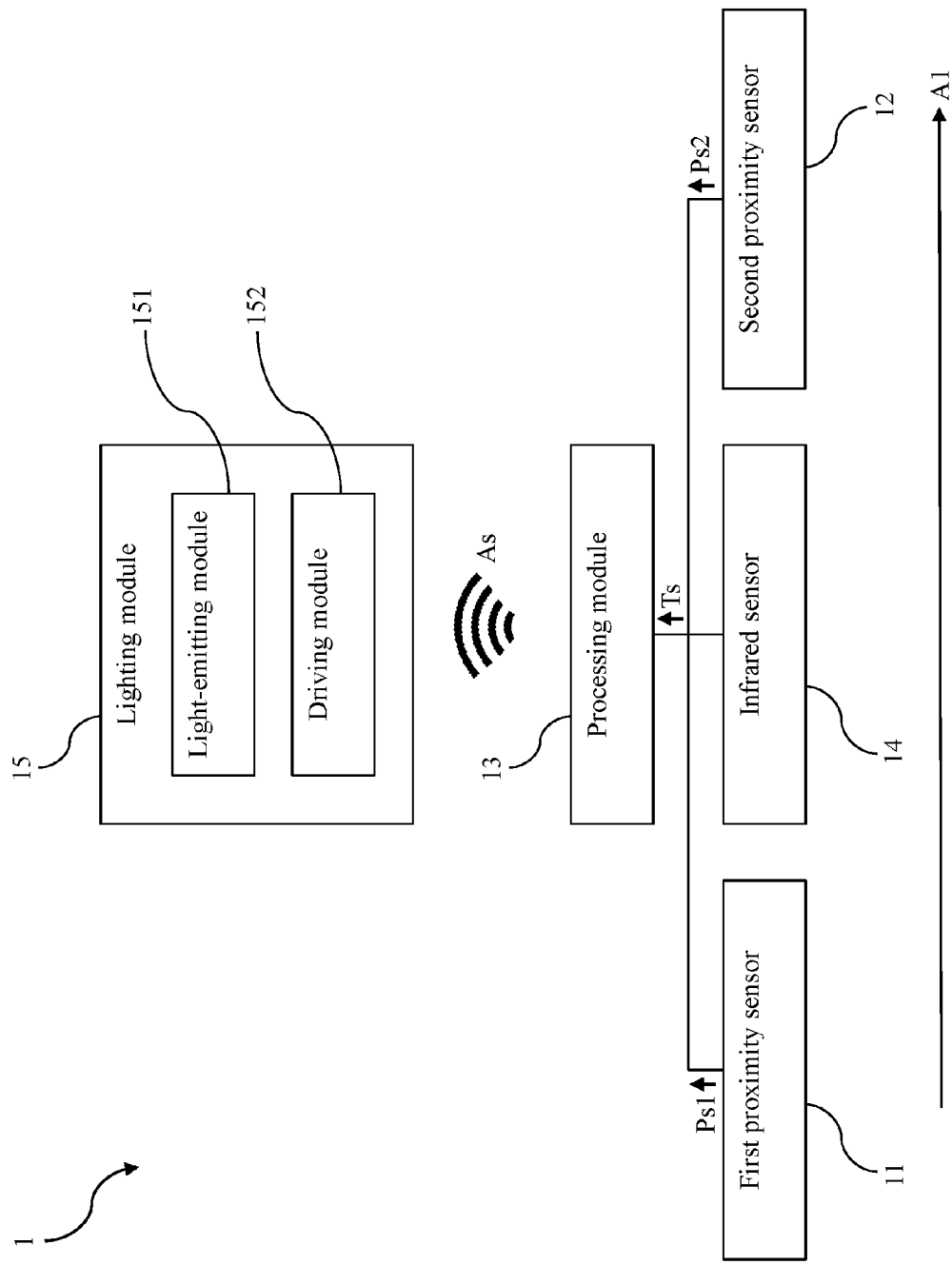
FIG. 2 is a first schematic view of the lighting system in operation in accordance with one embodiment of the present invention.

Please refer to FIG. 2, which is a first schematic view of the lighting system in operation in accordance with one embodiment of the present invention. As shown in FIG. 2, when the hand of a user moves from the first proximity sensor 11 to the second proximity sensor 12 (the moving direction of the hand of the user is as shown in the arrow A1), the first proximity sensor 11 generates a first sensing signal Ps1 first and transmits the first sensing signal Ps1 to the processing module 13. Then, the second proximity sensor 12 generates a second sensing signal Ps2 and transmits the second sensing signal Ps2 to the processing module 13. Afterward, the infrared sensor 14 can generate a high-level temperature sensing signal Ts when detecting the hand of the user.

Then, when the processing module 13 determines that the temperature sensing signal Ts is high-level, the processing module 13 determines that the first sensing signal Ps1 and the second sensing signal Ps2 are effective. Afterward, the processing module 13 generates a gesture recognition result according to the order of receiving the first sensing signal Ps1 and the second sensing signal Ps2. In this case, the time point of the processing module 13 receiving the first sensing signal Ps1 is earlier than the time point of the processing module 13 receiving the second sensing signal Ps2, the processing module 13 generates the gesture recognition result of a first direction (right). Next, the processing module 13 generates a light adjusting signal As according to the gesture recognition result and transmits the light adjusting signal As to the lighting module 15 in order to adjust the light characteristic of the lighting module 15.

In the embodiment, the light adjusting signal As is a brightness adjusting signal. The processing module 13 transmits the light adjusting signal As to the driving module 152. Thus, the driving module 152 can increase the brightness of the light-emitting module 151 according to the light adjusting signal As.

In another embodiment, the light adjusting signal As is a color temperature adjusting signal. The processing module 13 transmits the light adjusting signal As to the driving module 152. Thus, the driving module 152 can increase the color temperature of the light-emitting module 151 according to the light adjusting signal As.

The embodiment just exemplifies the present invention and is not intended to limit the scope of the present invention; any equivalent modification and variation according to the spirit of the present invention is to be also included within the scope of the following claims and their equivalents.

Figure 3:
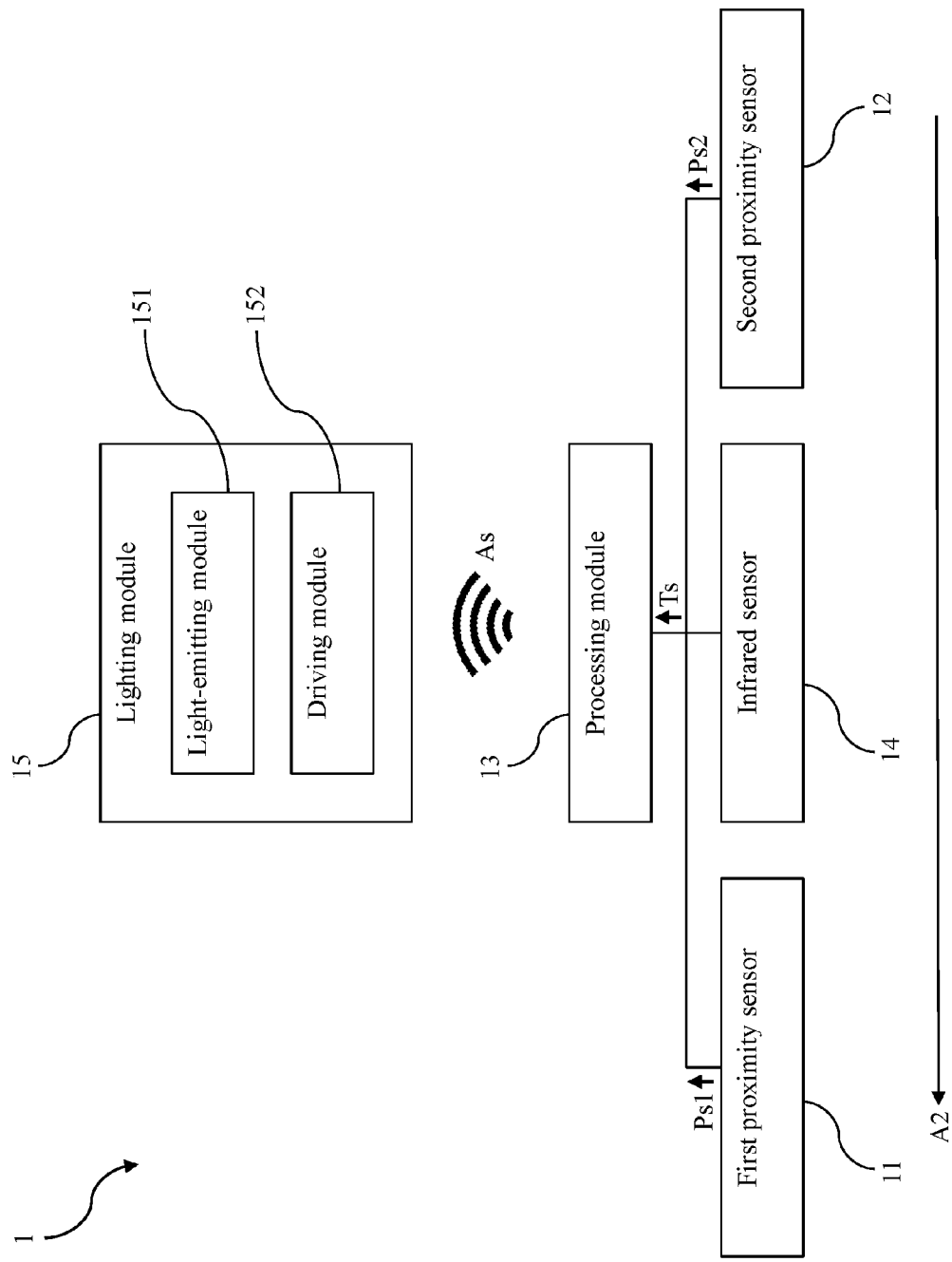
FIG. 3 is a third schematic view of the lighting system in operation in accordance with one embodiment of the present invention.

Please refer to FIG. 3, which is a third schematic view of the lighting system in operation in accordance with one embodiment of the present invention. As shown in FIG. 3, when the hand of the user moves from the second proximity sensor 12 to the first proximity sensor 11 (the moving direction of the hand of the user is as shown in the arrow A2), the second proximity sensor 12 generates the second sensing signal Ps2 first and transmits the second sensing signal Ps2 to the processing module 13. Then, the first proximity sensor 11 generates a first sensing signal Ps1 and transmits the first sensing signal Ps1 to the processing module 13. Afterward, the infrared sensor 14 can generate the high-level temperature sensing signal Ts when detecting the hand of the user.

Afterward, when the processing module 13 determines that the temperature sensing signal Ts is high-level, the processing module 13 determines that the first sensing signal Ps1 and the second sensing signal Ps2 are effective. Similarly, the processing module 13 generates the gesture recognition result according to the order of receiving the first sensing signal Ps1 and the second sensing signal Ps2. In this case, the time point of the processing module 13 receiving the second sensing signal Ps2 is earlier than the time point of the processing module 13 receiving the first sensing signal Ps1, the processing module 13 generates the gesture recognition result of a second direction (left). Then, the processing module 13 generates the light adjusting signal As according to the gesture recognition result and transmits the light adjusting signal As to the lighting module 15 in order to adjust the light characteristic of the lighting module 15. The first direction is contrary to the second direction. In another embodiment, the first direction may be up and the second direction may be down, which can be changed according to actual requirements.

In the embodiment, the light adjusting signal As is the brightness adjusting signal. The processing module 13 transmits the light adjusting signal As to the driving module 152. Thus, the driving module 152 can decrease the brightness of the light-emitting module 151 according to the light adjusting signal As.

In another embodiment, the light adjusting signal As is a color temperature adjusting signal. The processing module 13 transmits the light adjusting signal As to the driving module 152. Thus, the driving module 152 can decrease the color temperature of the light-emitting module 151 according to the light adjusting signal As.

The low-level temperature sensing signal Ts means that the first proximity sensor 11 and the second proximity sensor 12 are not triggered by a part of a human. In this case, the processing module 13 determines that the first sensing signal Ps 1 and the second sensing signal Ps 2 are ineffective.

In addition, the interval between the time point of the processing module 13 receiving the first sensing signal Ps1 and the time point of the processing module 13 receiving the second sensing signal Ps2 should be within a predetermined interval (e.g., 1 second, 2 seconds . . . ). If the processing module 13 determines that the interval between the time point of the processing module 13 receiving the first sensing signal Ps1 and the time point of the processing module 13 receiving the second sensing signal Ps2 is not within a predetermined interval, the processing module 13 determines that the first sensing signal Ps1 and the second sensing signal Ps2 are ineffective.

In another embodiment, the infrared sensor 14 is disposed between the first proximity sensor 11 and the second proximity sensor 12. When the processing module 13 receives the first sensing signal Ps1 and then receives the temperature sensing signal Ts, and determines that the temperature sensing signal Ts is low-level, the processing module 13 stops generating the gesture recognition result. Similarly, when the processing module 13 receives the second sensing signal Ps2 and then receives the temperature sensing signal Ts, and determines that the temperature sensing signal Ts is low-level, the processing module 13 stops generating the gesture recognition result. The above stopping mechanism and structure design can effectively decrease the power consumption, so the lighting system 1 can save more energy.

As described above, the lighting system 1 of the embodiment can provide a special gesture recognition mechanism. The processing module 13 can generate the gesture recognition result according to the order of receiving the first sensing signal Ps1 and the second sensing signal Ps2. Then, the processing module 13 can generate the light adjusting signal As according to the gesture recognition result, and transmit the light adjusting signal As to the lighting module 15 so as to adjust the light characteristic of the lighting module 15. This gesture recognition mechanism can be realized by several proximity sensors without any application or image processing technology, so the cost of the lighting system 1 can be reduced in order to conform to actual requirements.

In addition, the processing module 13 can determine whether the first sensing signal Ps1 and the second sensing signal Ps2 are effective or not according to the temperature sensing signal Ts of the infrared sensor 14. This mechanism can effectively avoid that the light characteristic adjusting function is mistakenly triggered. Accordingly, the light characteristic adjusting function of the lighting system 1 can achieve high detecting precision.

Further, the light characteristic adjusting function of the lighting system 1 can be used to realize the dimming function or the color temperature adjusting function, such that the lighting system 1 can meet the requirements of different users. As a result, the lighting system 1 can be more flexible in use and comprehensive in application.

Moreover, the light characteristic adjusting function of the lighting system 1 can be used to realize the intelligent control, so the lighting system 1 can be intellectualized. Thus, the lighting system 1 can meet the future development trend.

The embodiment just exemplifies the present invention and is not intended to limit the scope of the present invention; any equivalent modification and variation according to the spirit of the present invention is to be also included within the scope of the following claims and their equivalents.

Figure 4:
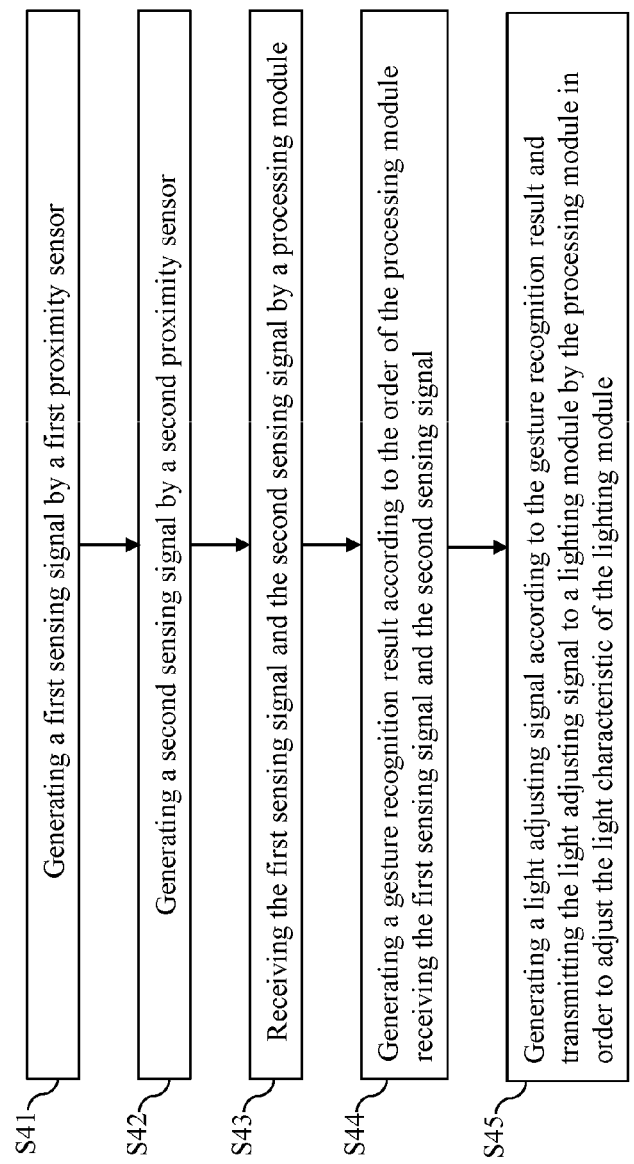
FIG. 4 is a flow chart of a lighting control method based on gesture recognition mechanism in operation in accordance with one embodiment of the present invention.

Please refer to FIG. 4, which is a flow chart of a lighting control method based on gesture recognition mechanism in operation in accordance with one embodiment of the present invention. As shown in FIG. 4, the lighting control method of the embodiment includes the following steps:

Step S41: generating a first sensing signal by a first proximity sensor.

Step S42: generating a second sensing signal by a second proximity sensor.

Step S43: receiving the first sensing signal and the second sensing signal by a processing module.

Step S44: generating a gesture recognition result according to the order of the processing module receiving the first sensing signal and the second sensing signal.

Step S45: generating a light adjusting signal according to the gesture recognition result and transmitting the light adjusting signal to a lighting module by the processing module in order to adjust the light characteristic of the lighting module.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is worthy to point out that the currently available dimming or color temperature adjusting technologies are complicated, which cannot effectively reduce the costs of lighting devices or lighting systems. Accordingly, the currently available dimming or color temperature adjusting technologies cannot conform to actual requirements. On the contrary, according to one embodiment of the present invention, the lighting system based on gesture recognition mechanism includes a first proximity sensor, a second proximity sensor, a processing module and a lighting module. The first proximity sensor generates a first sensing signal. The second proximity sensor generates a second sensing signal. The processing module receives the first sensing signal and the second sensing signal. The processing module generates a gesture recognition result according to the order of receiving the first sensing signal and the second sensing signal. Then, the processing module generates a light adjusting signal according to the gesture recognition result, such that the light adjusting signal is transmitted to the lighting module so as to adjust the light characteristic of the lighting module. This gesture recognition mechanism can be realized by several proximity sensors without any application or image processing technology, so this gesture recognition mechanism can significantly decrease the complexity of the light characteristic adjusting (dimming or color temperature adjusting) mechanism. Thus, the cost of the lighting system can be reduced in order to conform to actual requirements.

Also, according to one embodiment of the present invention, the lighting system further includes an infrared sensor, such that the processing module can determine whether the first sensing signal and the second sensing signal are effective or not according to the temperature sensing signal of the infrared sensor. This mechanism can effectively avoid that the light characteristic adjusting function is mistakenly triggered. Accordingly, the light characteristic adjusting function of the lighting system can achieve high detecting precision.

Further, according to one embodiment of the present invention, the light characteristic adjusting function of the lighting system can be used to realize the dimming function or the color temperature adjusting function, such that the lighting system can meet the requirements of different users. As a result, the lighting system can be more flexible in use and comprehensive in application.

Moreover, according to one embodiment of the present invention, the light characteristic adjusting function of the lighting system can be used to realize the intelligent control, so the lighting system can be intellectualized. Thus, the lighting system can meet the future development trend. As set forth above, the lighting system according to the embodiments of the present invention can definitely achieve great technical effects.

Figure 5:
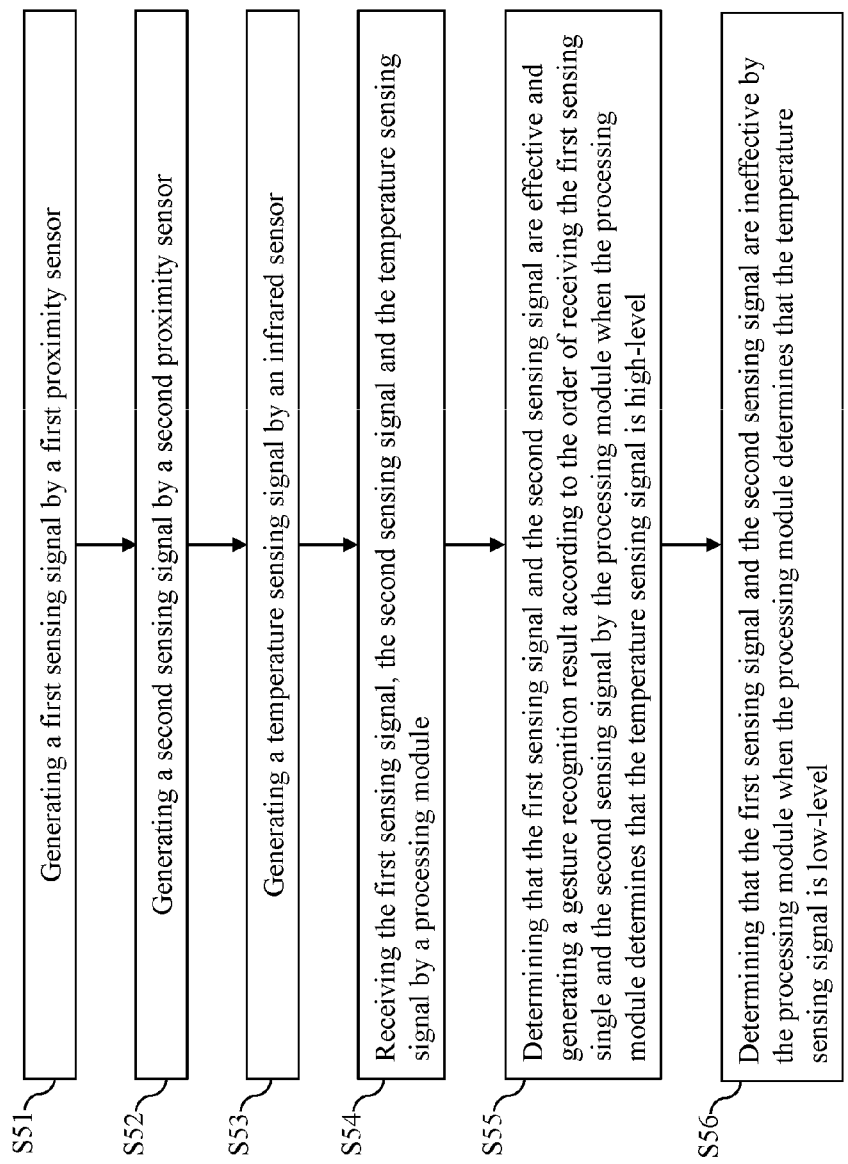
FIG. 5 is a flow chart of a lighting control method based on gesture recognition mechanism in operation in accordance with another embodiment of the present invention.

Please refer to FIG. 5, which is a flow chart of a lighting control method based on gesture recognition mechanism in operation in accordance with another embodiment of the present invention. Please also refer to FIG. 1~FIG. 3. The embodiment describes the detailed steps of the lighting control method. As shown in FIG. 5, the lighting control method of the embodiment includes the following steps:

Step S51: generating a first sensing signal by a first proximity sensor.

Step S52: generating a second sensing signal by a second proximity sensor.

Step S53: generating a temperature sensing signal by an infrared sensor.

Step S54: receiving the first sensing signal, the second sensing signal and the temperature sensing signal by a processing module.

Step S55: determining that the first sensing signal and the second sensing signal are effective and generating a gesture recognition result according to the order of receiving the first sensing single and the second sensing signal by the processing module when the processing module determines that the temperature sensing signal is high-level. When the time point of the processing module 13 receiving the first sensing signal Ps1 is earlier than the time point of the processing module 13 receiving the second sensing signal Ps2, the processing module 13 generates the gesture recognition result of the first direction (right). When the time point of the processing module 13 receiving the second sensing signal Ps2 is earlier than the time point of the processing module 13 receiving the first sensing signal Ps1, the processing module 13 generates the gesture recognition result of the second direction (left).

Step S56: determining that the first sensing signal and the second sensing signal are ineffective by the processing module when the processing module determines that the temperature sensing signal is low-level.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

According to one embodiment of the present invention, the lighting system based on gesture recognition mechanism includes a first proximity sensor, a second proximity sensor, a processing module and a lighting module. The first proximity sensor generates a first sensing signal. The second proximity sensor generates a second sensing signal. The processing module receives the first sensing signal and the second sensing signal. The processing module generates a gesture recognition result according to the order of receiving the first sensing signal and the second sensing signal. Then, the processing module generates a light adjusting signal according to the gesture recognition result, such that the light adjusting signal is transmitted to the lighting module so as to adjust the light characteristic of the lighting module. This gesture recognition mechanism can be realized by several proximity sensors without any application or image processing technology, so this gesture recognition mechanism can significantly decrease the complexity of the light characteristic adjusting (dimming or color temperature adjusting) mechanism. Thus, the cost of the lighting system can be reduced in order to conform to actual requirements.

Also, according to one embodiment of the present invention, the lighting system further includes an infrared sensor, such that the processing module can determine whether the first sensing signal and the second sensing signal are effective or not according to the temperature sensing signal of the infrared sensor. This mechanism can effectively avoid that the light characteristic adjusting function is mistakenly triggered. Accordingly, the light characteristic adjusting function of the lighting system can achieve high detecting precision.

Further, according to one embodiment of the present invention, the light characteristic adjusting function of the lighting system can be used to realize the dimming function or the color temperature adjusting function, such that the lighting system can meet the requirements of different users. As a result, the lighting system can be more flexible in use and comprehensive in application.

Moreover, according to one embodiment of the present invention, the light characteristic adjusting function of the lighting system can be used to realize the intelligent control, so the lighting system can be intellectualized. Thus, the lighting system can meet the future development trend.

Furthermore, according to one embodiment of the present invention, the design of the lighting system is simple, so the lighting system can achieve the desired technical effects without significantly increasing the cost thereof. Therefore, the lighting system can have high commercial value.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting system based on gesture recognition mechanism, comprising:
   a first proximity sensor configured to generate a first sensing signal;
   a second proximity sensor configured to generate a second sensing signal;
   a processing module configured to receive the first sensing signal and the second sensing signal; and
   a lighting module;
   wherein the processing module is configured to generate a gesture recognition result according to an order of receiving the first sensing signal and the second sensing signal, and generate a light adjusting signal according to the gesture recognition result, whereby the light adjusting signal is transmitted to the lighting module so as to adjust a light characteristic of the lighting module, wherein when a time point of the processing module receiving the first sensing signal is earlier than a time point of the processing module receiving the second sensing signal, the processing module is configure to generate the gesture recognition result of a first direction, wherein when the time point of the processing module receiving the second sensing signal is earlier than the time point of the processing module receiving the first sensing signal, the processing module is configure to generate the gesture recognition result of a second direction.

2. The lighting system based on gesture recognition mechanism as claimed in claim 1, further comprising an infrared sensor configured to generate a temperature sensing signal and transmit the temperature sensing signal to the processing module, wherein the processing module is configured to generate the gesture recognition result according to the temperature sensing signal and the order.

3. The lighting system based on gesture recognition mechanism as claimed in claim 2, wherein when the processing module determines that the temperature sensing signal is high-level, the processing module is configured to determine that the first sensing signal and the second signal are effective, and generate the gesture recognition result according to the order of receiving the first sensing signal and the second sensing signal.

4. The lighting system based on gesture recognition mechanism as claimed in claim 3, wherein when the processing module determines that the temperature sensing signal is low-level, the processing module is configured to determine that the first sensing signal and the second signal are ineffective.

5. The lighting system based on gesture recognition mechanism as claimed in claim 3, wherein the infrared sensor is disposed between the first proximity sensor and the second proximity sensor, wherein when the processing module determines that the temperature sensing signal is low-level, the processing module is configured to stop generating the gesture recognition result.

6. The lighting system based on gesture recognition mechanism as claimed in claim 1, wherein the first direction is contrary to the second direction.

7. The lighting system based on gesture recognition mechanism as claimed in claim 1, wherein the lighting module comprises a light-emitting module and a driving module.

8. The lighting system based on gesture recognition mechanism as claimed in claim 7, wherein the light-emitting module is a light-emitting diode or a light-emitting diode array.

9. The lighting system based on gesture recognition mechanism as claimed in claim 1, wherein the light characteristic is a brightness or a color temperature.

* * * * *